United States Patent [19]
Nam

[11] Patent Number: 6,141,598
[45] Date of Patent: Oct. 31, 2000

[54] VEHICLE ASSEMBLY LINE CONTROL SYSTEM AND METHOD

[75] Inventor: Dong-kil Nam, Ulsani-si, Rep. of Korea

[73] Assignee: Hyundai Motor Company, Rep. of Korea

[21] Appl. No.: 09/054,072

[22] Filed: Apr. 6, 1998

[51] Int. Cl.[7] ................................................. G06F 19/00
[52] U.S. Cl. ................................................. 700/95; 705/7
[58] Field of Search ....................... 700/95, 97; 118/669; 705/7

[56] References Cited

U.S. PATENT DOCUMENTS

| | | | |
|---|---|---|---|
| 4,590,654 | 5/1986 | Kajiura | 29/407 |
| 4,931,944 | 6/1990 | Richter et al. | 364/468 |
| 4,958,292 | 9/1990 | Kaneko et al. | 364/468 |
| 5,841,659 | 11/1998 | Tanaka et al. | 364/468 |

*Primary Examiner*—William Grant
*Assistant Examiner*—Zoila Cabrera
*Attorney, Agent, or Firm*—Finnegan, Henderson, Farabow, Garrett & Dunner LLP

[57] ABSTRACT

Disclosed is a pull-type vehicle assembly line control system and method in which a production plan for a final assembly process, or a trim process, is established first, and, using this as a basis, a production plan for a paint process then that for a vehicle body assembly process are set up. Further, in the present invention, information on the progress for the three main assembly processes—the vehicle body assembly process, paint process, and trim process—is mutually exchanged such that a dynamic re-specification assembly process is utilized in which operational sequences for each of the process are continuously readjusted to adapt to the overall assembly process.

6 Claims, 8 Drawing Sheets

FIG. 1

| ORDER NO. | BODY TYPE | COLOR | TRIM OPTION |
|---|---|---|---|
| 01 | B1 | C1 | T1 |
| 02 | B1 | C2 | T1 |
| 03 | B1 | C2 | T2 |
| 04 | B1 | C3 | T2 |
| 05 | B2 | C3 | T3 |
| 06 | B2 | C4 | T3 |
| 07 | B2 | C5 | T3 |

FIG. 2A

| VIN | BODY TYPE |
|---|---|
| 1 | B1 |
| 2 | B1 |
| 3 | B1 |
| 4 | B1 |
| 5 | B2 |
| 6 | B2 |
| 7 | B2 |

| PLANNED TO ACHIEVED SEQUENCE RATIO | PRIOR ART | PRESENT INVENTION | IMPROVEMENT |
|---|---|---|---|
| PAINT LINE | 92% | 98% | 6% |
| TRIM LINE | 90% | 95% | 5% |

VEHICLE ASSEMBLY LINE CONTROL SYSTEM AND METHOD

BACKGROUND OF THE INVENTION (a) Field of the Invention

The present invention relates to a vehicle assembly line control system and method used for the production of vehicles.

(b) Description of the Related Art

The assembly of vehicles is generally realized through a plurality of main assembly processes—a vehicle body assembly process, a paint process, and a trim process—and the supply of parts for the main assembly processes. Parts supplied include basic parts such as the engine and transmission, and parts chosen as options by the consumer such as the stereo system, type of seats, etc.

In such a vehicle assembly process, it is ideal to sequence the vehicles to be assembled in a fixed pattern (for the vehicle body and trim processes) or consecutively (for the paint process). That is, production efficiency can be greatly increased in the vehicle body and trim processes if the vehicles are sequenced to be fed through the assembly process in an alternating pattern. For example, if the vehicles are arranged in an alternating pattern of type A and B vehicles, where type A vehicles require the mounting of automatic transmissions and type B vehicles require manual transmissions, both automatic and manual transmission assembly stations can operate simultaneously as the vehicles pass through the assembly line. However, if the vehicles are arranged in an A, A, A, B, B . . . pattern, the automatic transmission assembly station will initially be overburdened while the manual transmission assembly station remains idle, then vice versa as the B-type vehicles are fed through the assembly line. This sequencing of vehicles in a balanced manner for the assembly process is generally termed leveling.

On the other hand, vehicles requiring the same paint color and/or design should be grouped together and arranged sequentially for the paint process. This minimizes the number of times paint nozzles for the normally fully-automated paint process require cleaning. As a result, the time-consuming and costly process of cleaning the paint nozzles is reduced.

However, in such a prior art vehicle assembly line system, sequencing the vehicles for the three main vehicle assembly processes so that they are arranged to improve production efficiency often runs counter to one another. Namely, arranging the vehicles in an order that maximizes production efficiency for the vehicle body assembly process is normally inefficient for the paint process, and a sequence that is ideal for the paint process is not suitable for the trim process. For example, if the vehicles are arranged so that vehicles requiring the same paint color and/or design pass through the assembly line in sequence, production efficiency for the vehicle body assembly process and trim process is drastically reduced.

Figure 9:
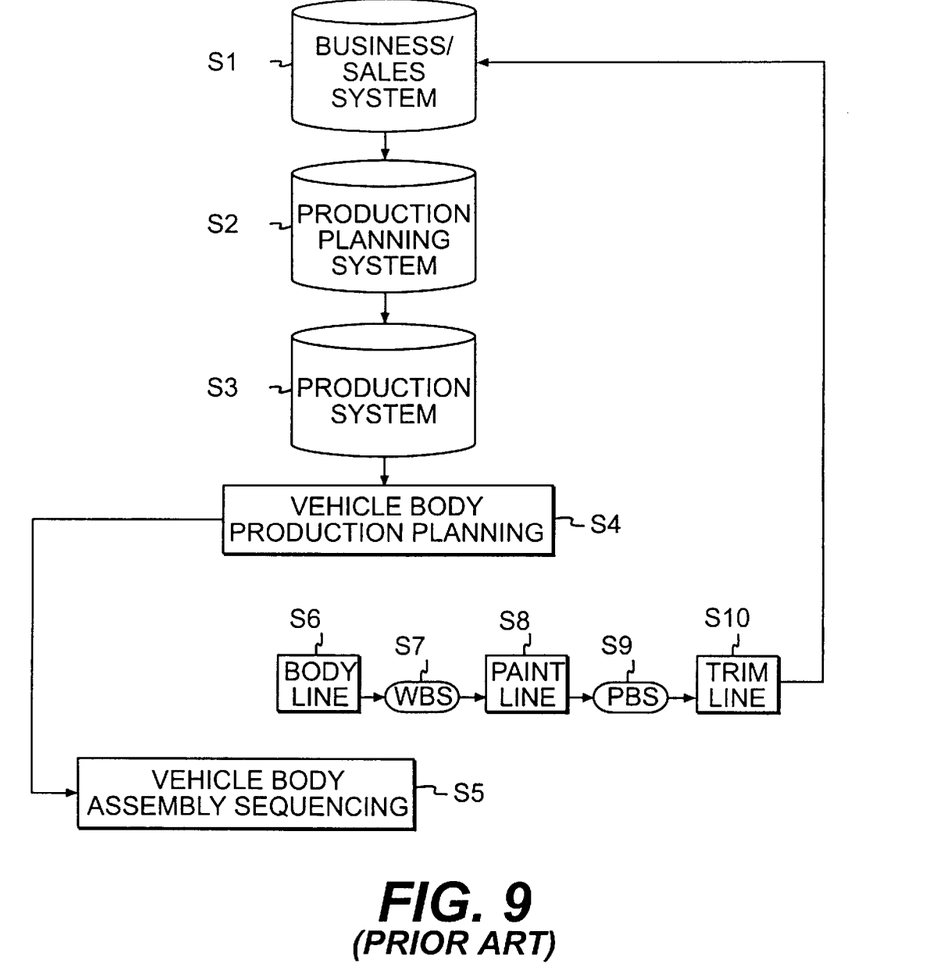
FIG. 9 is a flow chart of a prior art vehicle assembly method.
Figure 10:
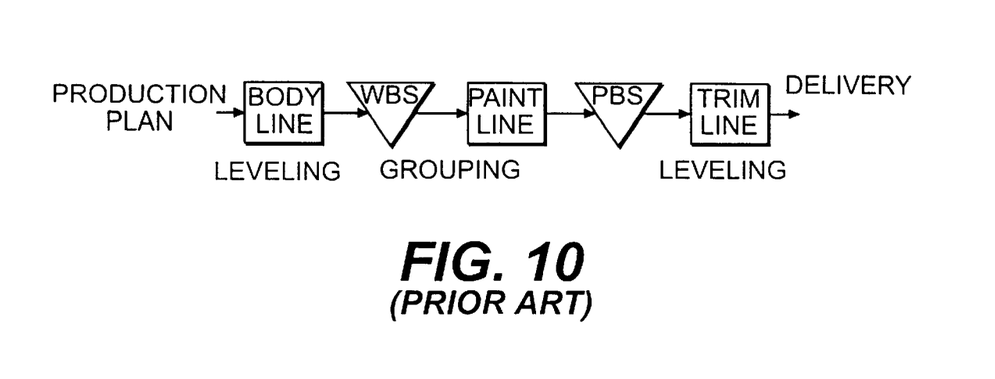
FIG. 10 is a schematic diagram of a prior art vehicle assembly system using the method described in FIG. 9.

Various prior art vehicle assembly systems and methods have been developed to solve such problems. Referring to FIGS. 9 and 10, shown respectively are a flow chart of a prior art vehicle assembly method and a schematic diagram of a prior art vehicle assembly system using the method described in FIG. 9.

In the prior art vehicle assembly method, a host computer system first receives vehicle production orders via a business and sales network in step S1. Next, in step S2, a daily production plan is established according to the production orders and transmitted to a production planning system. According to the daily production plan, a main computer of the production system then places orders for required materials and parts in step S3.

Following the above step and using the daily production plan as a basis, a vehicle body production plan is established in step S4, a vehicle body assembly sequence is arranged in step S5, and vehicle bodies are assembled through metal pressing, welding, and other processes in step S6. In the vehicle body assembly sequencing step S5, leveling is performed to increase production efficiency. Also, during the assembly of the vehicle bodies in step S6, vehicles found having defects are temporarily removed from the assembly line, corrected, then replaced back into the assembly line.

Next, completed vehicle bodies are temporarily placed in a white body storage (WBS) in step S7. In the WBS, the completed vehicle bodies are re-sequenced in an order ideal for the paint process. That is, the vehicle bodies are grouped together such that those requiring the same paint color and/or design are fed through the paint process following one another consecutively.

In the paint process, the vehicle bodies first undergo waterproofing and undercoating processes, after which they are painted in the colors and/or designs according to the production plan. For the painting of vehicles, it is now standard practice to utilize robotic technology for the paint process. Because of the high cost of such machinery, most vehicle assembly lines normally utilize only a single robotic system. As a result, the paint nozzles must be cleaned before the introduction of each new paint color. Accordingly, the vehicle bodies undergo a color grouping process in the WBS or during the paint process as described above such that a group of consecutive vehicle bodies can be painted to minimize the number of times the paint nozzles require cleaning. Further, in the paint process, as in the vehicle body assembly process of step S6, vehicles found to have defects are removed from the assembly line, corrected, then replaced back into the assembly process.

After the paint process of step S8, the vehicles are placed in a painted body storage (PBS). In the PBS, the vehicle bodies are again re-sequenced so that they are placed in an ideal sequence for the trim process in step S9.

Next, parts chosen as options by the consumer and other various final parts are mounted to the vehicle bodies to complete the trim process in step S10, thereby concluding the vehicle assembly process.

However, in the above prior art vehicle assembly method, much time is required to fully rearrange the vehicles in the WBS and PBS to an ideal sequence for the subsequent processes. For example, when the vehicles are placed in the WBS after the vehicle body assembly process, the re-sequencing of the vehicle bodies so that they are clustered together in groups requiring the same paint color and/or design for the paint process is time consuming. Accordingly, production efficiency is greatly reduced.

This problem is compounded by two factors: 1) the sequencing of the vehicles for the vehicle body assembly process prior to assembly, for the paint process in the WBS, and for the trim process in the PBS is done to meet ideal conditions for that process only without consideration to the subsequent process, and 2) the removal of defective vehicle bodies for correction of the same in the vehicle body and paint processes additionally complicates the sequencing.

Further, when vehicles are removed from the assembly line during the vehicle body assembly process and paint process as a result of discovered defects, if the defect is not quickly corrected and the vehicle body replaced, or if the defective vehicle is the last in the grouping (e.g., of a particular paint color), the advantages of sequencing the vehicles can not be realized. This problem can become severe if defects are found in a number of consecutive vehicles.

Finally, because it is not practical to provide enough physical space for the WBS and PBS to fully perform their function (i.e., to hold enough vehicle bodies to perform their task of re-sequencing the same), there is a limit to how much the vehicle bodies can be rearranged for the subsequent steps. Accordingly, vehicles are often assembled more slowly than the established production plans.

SUMMARY OF THE INVENTION

The present invention has been made in an effort to solve the above problems.

It is an object of the present invention to provide a pull-type vehicle assembly line control system and method which increases productivity by balancing the assembly process so that some production processes are not overburdened while others remain idle, and enables the easy returning of vehicles that have become disordered during the assembly process such that vehicles are re-sequenced to approximate an original production plan.

To achieve the above object, the present invention provides a pull-type vehicle assembly line control system and method in which a production plan for a final assembly process, or a trim process, is established first, and, using this as a basis, a production plan for a paint process then that for a vehicle body assembly process are set up.

Further, in the present invention, information on the progress for the three main assembly processes—the vehicle body assembly process, paint process, and trim process—is mutually exchanged such that a dynamic re-specification assembly process is utilized in which operational sequences for each of the process are continuously readjusted to adapt to the overall assembly process.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

A preferred embodiment of the present invention will now be described in detail with reference to the accompanying drawings.

A few general concepts will first be explained for better understanding of a pull-type vehicle assembly line control system of the present invention.

Figure 1:
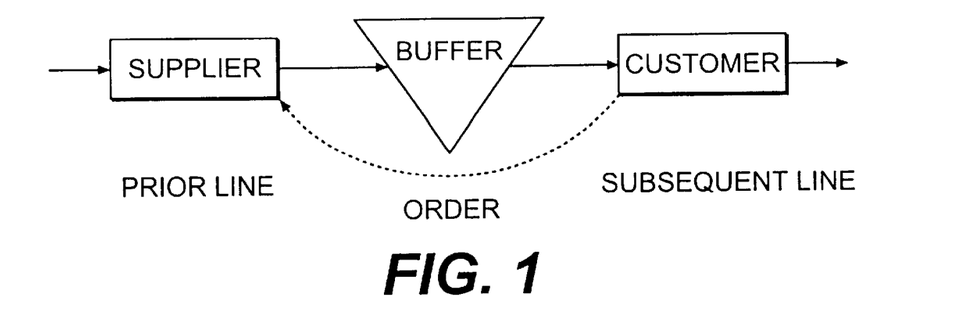
FIG. 1 is a flow chart used to describe concepts of a pull-type vehicle assembly process of the present invention.

Referring first to FIG. 1, the inventive pull-type vehicle assembly line control system and method conceptualizes all prior and subsequent assembly processes into a supplier and a customer. Namely, if a customer, or subsequent process, makes an order, a supplier, or prior process, fills the order by establishing a production sequence. This method of placing and filling orders is continuously realized between each production line throughout the entire assembly process of the present invention, thereby improving production efficiency and the probability of meeting pre-established production schedules. Accordingly, the assembly line control system and method of the present invention is completely opposite of the push-type method of the prior art.

A buffer is normally provided between prior and subsequent processes. In the prior art, the buffer acts as a temporary storage and re-sequencing area before the subsequent process (i.e., the white body storage between the vehicle body line and the paint line, and the painted body storage between the paint line and the trim line). In the present invention, the buffer performs these two functions of the prior art, in addition to detecting the development of the assembly process in the prior and subsequent processes.

If the supply of vehicles bodies from a prior process is different from that ordered from a subsequent process, the buffer re-sequences the vehicles to an order requested by the subsequent process. Here, the buffer performs the re-sequencing function within a predetermined range. For example, in a small factory the predetermined range may be set at five vehicles, while in a large factory the range may be set at sixty vehicles. This range of the number of vehicles to work in is referred to as a bucket.

In the present invention, there are provided a PBS bucket and a WBS bucket, the PBS bucket being established for a PBS acting as a buffer between a trim line and a paint line, and the WBS bucket being established for a WBS acting as a buffer between the paint line and a vehicle body line. A size of the PBS bucket is determined by a size of the PBS, and by considering differences in speeds at which processes are completed in the lines prior and subsequent to the PBS and how disordered vehicles become in the prior line. A size of the WBS bucket is determined using the same criteria. However, because the PBS bucket is at a latter location in the assembly line, where vehicle bodies are more disordered, the PBS bucket is normally larger than the WBS bucket, preferably a multiple of the WBS bucket for simpler readjusting of the sequence of the vehicles. With the use of such bucket units in the present invention, a more realistic and efficient approach is taken to re-sequencing vehicles in the PBS and WBS.

Figure 2A:
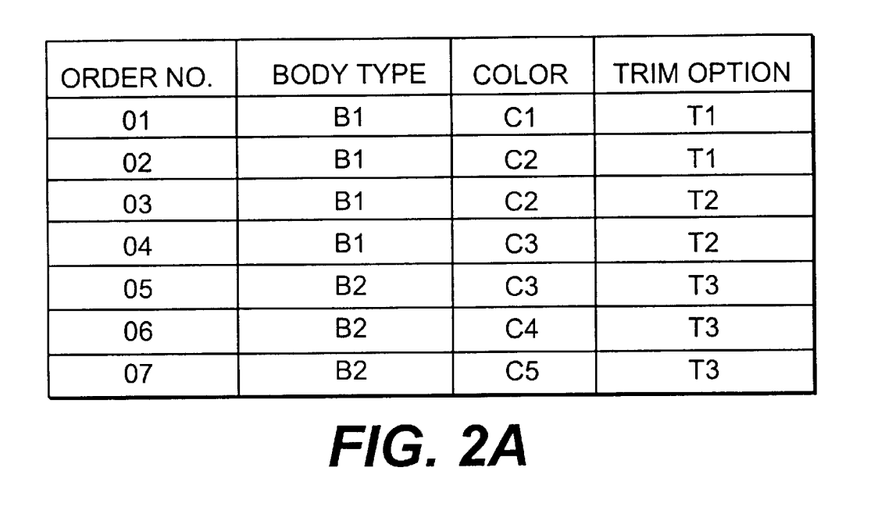
FIG. 2A is a chart illustrating examples of order numbers according to vehicle type, paint color and trim options.
Figure 2B:
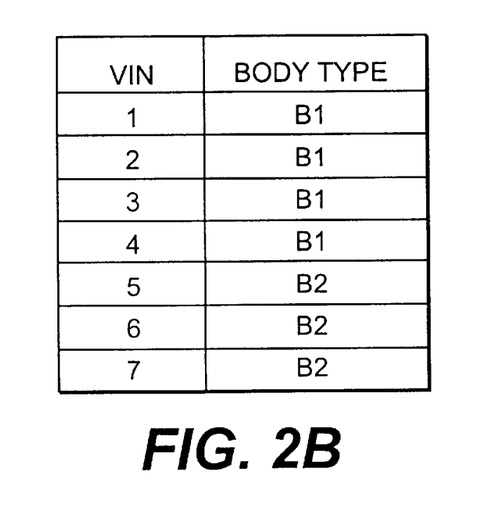
FIG. 2B is a chart illustrating examples of a correspondence of vehicle identification numbers with body type.

Referring now to FIGS. 2A and 2B, shown are charts used for describing a dynamic re-specification concept of the present invention. Vehicles normally receive a vehicle identification number (VIN) during assembly, and an order number from a production system to identify a certain vehicle to an order made by a customer. FIG. 2A shows a chart of hypothetical order numbers, while FIG. 2B illustrates a chart of hypothetical VINs.

Generally one order number corresponds to one VIN. In the case where order number 01 is matched to VIN 1, if a difficulty arises in a vehicle having VIN 1 during the assembly process, problems naturally arise in the ability to complete order number 01 as planned. However, using the dynamic re-specification method of the present invention, considerations are made for completion deadlines of order numbers to influence sequencing of vehicles in the buffers. Namely, in the present invention, the re-sequencing of vehicles involves the exchange of order numbers between like vehicles to prepare the sequence of the vehicles for the subsequent line.

Figure 3:
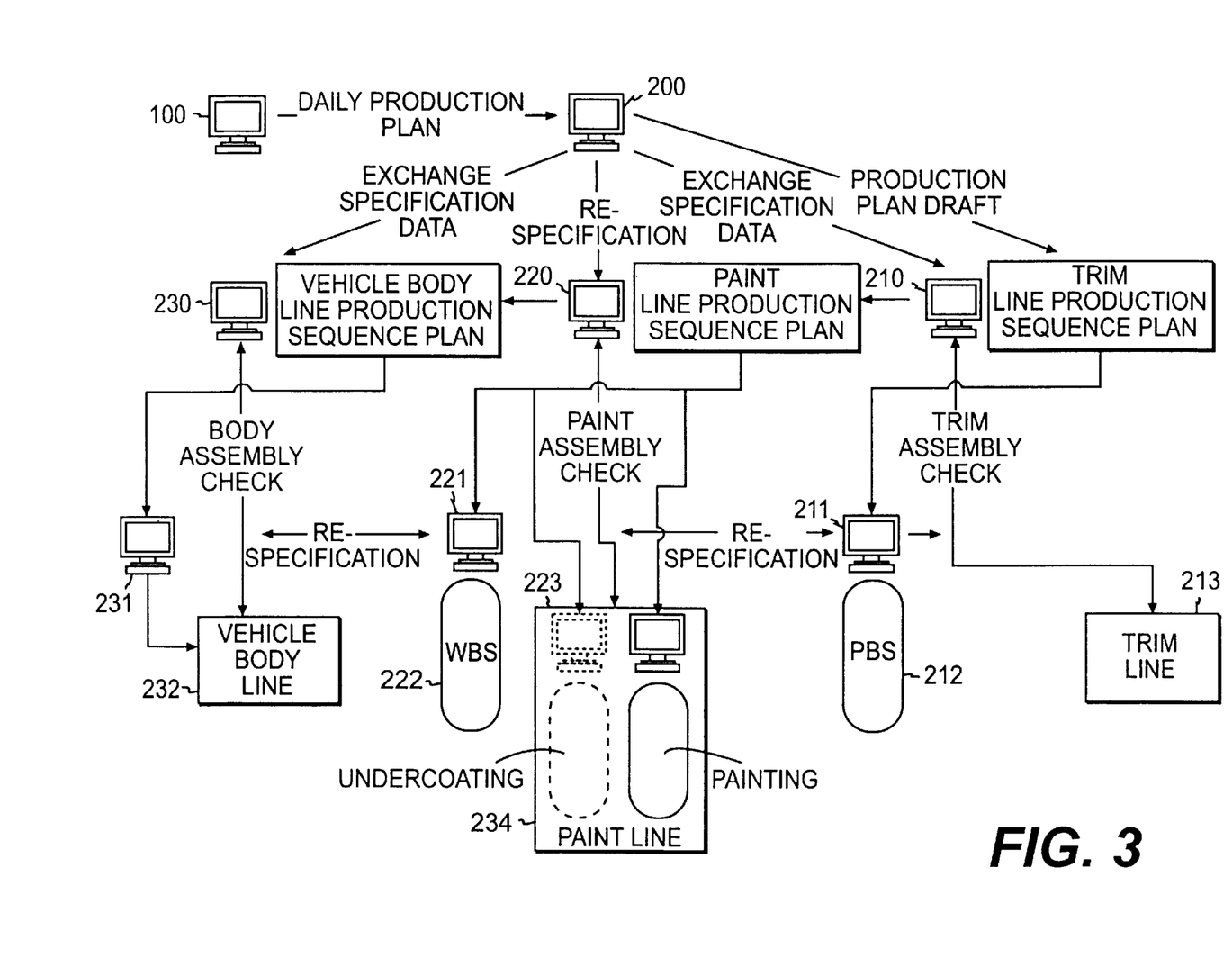
FIG. 3 is a block diagram illustrating the pull-type vehicle assembly process according to a preferred embodiment of the present invention.

Referring now to FIG. 3, shown is a schematic view of the pull-type vehicle assembly line control system according to a preferred embodiment of the present invention. The inventive pull-type vehicle assembly system comprises a host computer system 100 electronically connected to and controlling business, production, and sales computer networks, a production management control system 200 controlling all production processes, a trim line control slave system 210, a paint line control slave system 220, a vehicle body line control slave system 230, a feed sequence control slave system 231, a vehicle body line 232, a paint line 234, a trim line 213, a paint dynamic re-specification control system 221, a white body storage (WBS) 222, an undercoat paint control system 223, a color grouping control system (not shown), and a trim dynamic re-specification control system 211.

The host computer system 100 receives orders from the business and sales networks, then establishes daily and weekly production plans according to the received orders.

The production management control system 200 establishes detailed production plans according to the daily and weekly production plans generated by the host computer system 100, controls each of the slave computer systems 210, 220, and 230, and receives information on the production progress of each of the three main assembly processes—vehicle body, painting, and trim—from the slave computer systems 210, 220, and 230.

The trim line control slave system 210, using the detailed production plans established by the production management control system 200, creates a production sequence plan for trim assembly according to vehicle type and parts options. Here, if problems occur to cause a hindrance to production such as malfunctions in production equipment or defects being discovered in vehicles undergoing assembly in the vehicle body line 232 or the paint line 234, such information is received from the vehicle body line control slave system 230 and the paint line control slave system 220 such that the trim line control slave system 210 re-sets the production sequence plan for the trim process.

The paint line control slave system 220 establishes a production sequence plan for the paint process according to vehicle type, orders, etc. in a manner suitable with the trim line production sequence plan set up by the trim line control slave system 210. Further, the paint line control slave system 220 controls the processes involved in the paint line 234.

The vehicle body line control slave system 230 establishes a production sequence plan for the assembly of vehicle bodies with consideration made to the production sequence plan generated by the paint line control slave system 220.

As described above, production plans are established starting with the last process, or trim process, by the trim line control slave system 210, then, using this as a basis, by the paint line control slave system 220, and finally by the vehicle body line control slave system 230. Further, buckets are set up within each of the production plans, the size of the buckets being determined by the overall size of the assembly line.

The feed sequence control slave system 231 determines a sequence by which the vehicles will be supplied through the vehicle body line 232 according to control by the vehicle body line control slave system 230.

In the vehicle body line 232, metal is pressed, and the pressed metal is welded to assembly vehicle bodies according to control of the feed sequence control slave system 231. If detects are detected during this process, the vehicle bodies or parts are removed from the vehicle body line 232, the defects are corrected, then the parts or bodies are re-entered into the vehicle body line 232 in a suitable sequence.

Completed vehicle bodies from the vehicle body line 232 enter the WBS 222 where the vehicle bodies temporarily remain to be re-sequenced in an order that is suitable for the paint line 234. Namely, the paint dynamic re-specification control system 221 re-sequences the vehicle bodies that have become disordered in the vehicle body line 232 from removal to correct defects.

Next, the vehicle bodies enter the paint line 234 to receive waterproofing and undercoating paint by control from the undercoat paint control system 223, then are grouped with spaces between the groups in suitable units of vehicle bodies requiring the same paint color and/or design by the paint dynamic re-specification control slave system 221. The vehicle bodies are subsequently painted in the paint line 234.

After the painting process, painted vehicles enter the PBS 212. Here, the trim dynamic re-specification control system 211 re-sequences the vehicles that have become disordered in the paint line 234 from removal to correct defects, and to an order that is suitable for the trim line 213 and established in the production plan. Next, the vehicles enter the trim line 213 where parts chosen as options by the consumer and other various final parts are mounted to the vehicle bodies, thereby completing the vehicle assembly process.

In the above, before vehicles enter the WBS 222, the vehicle body line control slave system 230 and the paint line control slave system 220 exchange detailed information used to re-sequence the vehicles, which have become disordered in the vehicle body line 232 from detected defects and as a result of mechanical problems in the assembly process, in an order suitable for the paint line 234. Here, the vehicles are not physically moved in a sequence for the paint line 234, but, rather, through the dynamic re-specification method, order numbers of the vehicles are exchanged to vehicles having matching specifications. That is, vehicles are relabeled with new order numbers such that the production schedule can be maintained.

Likewise, before vehicles enter the PBS 212, the paint line control slave system 220 and the trim line control slave system 210 exchange detailed information used to re-sequence the vehicles, which have become disordered in the paint line 234 from detected defects and from mechanical problems in the assembly process, in an order suitable for the trim line 213. As in the above, some of the vehicles are relabeled using the dynamic re-specification method such that order numbers are exchanged between vehicles having the same specifications, thereby enabling vehicles to be assembled according to the production schedule.

The following is a summary of the establishment of the production sequence plan and the execution of the assembly processes for the inventive pull-type vehicle assembly line control system. First, detailed information for vehicles to be produced is analyzed then the production plan for the last process, or the trim line, is established. Using this as a basis, the production plan for the paint line is set up, then that for the vehicle body line is determined. Accordingly, a daily production plan is generated, after which the vehicles are assembled. Following the vehicle body and paint processes, the vehicles are re-sequenced using the dynamic re-specification method for the subsequent process.

Figure 4A:
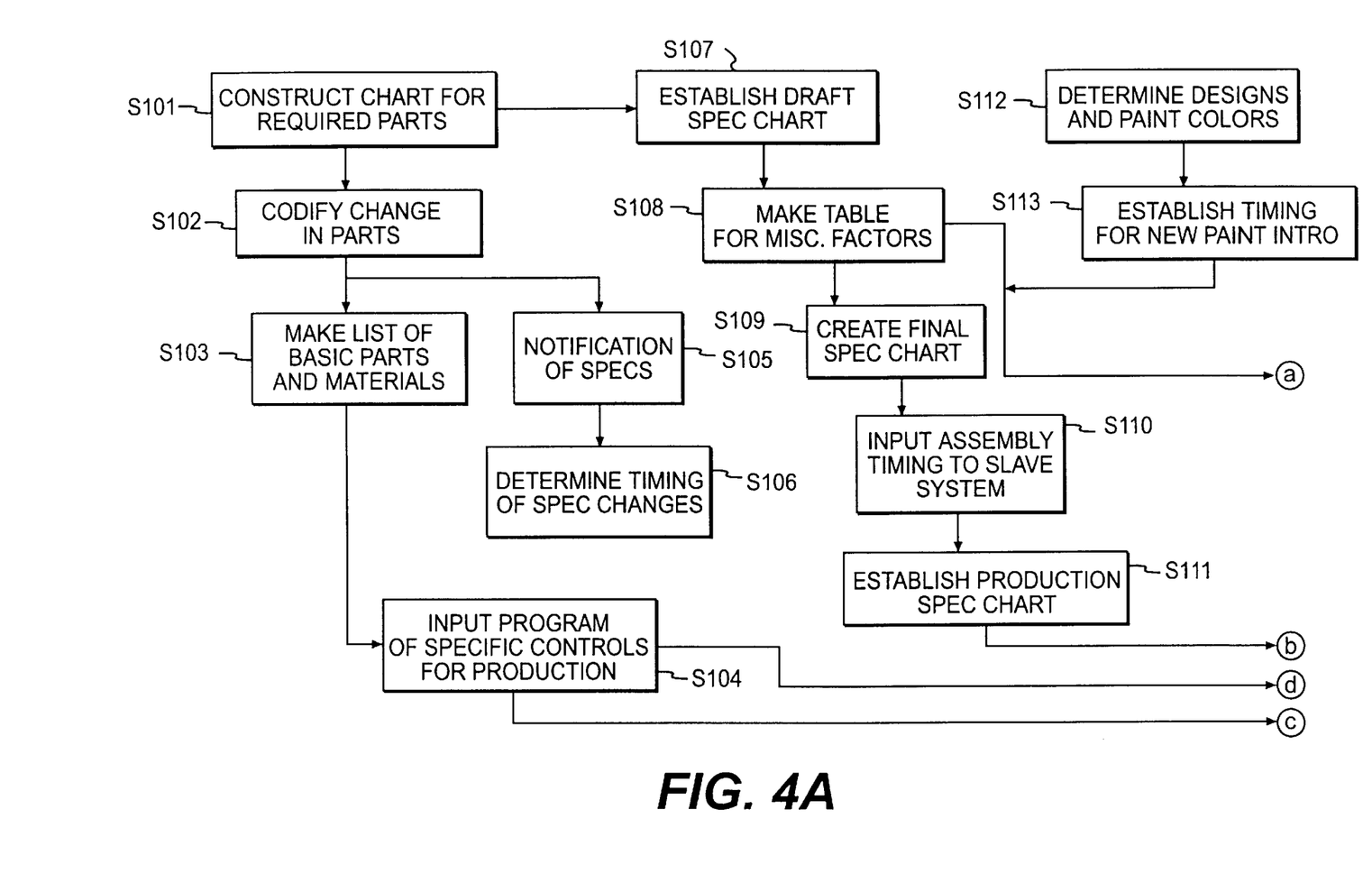
FIGS. 4A–4B are flow diagrams illustrating a sequence of production processes for the pull-type vehicle assembly line control system of the present invention.
Figure 4B:
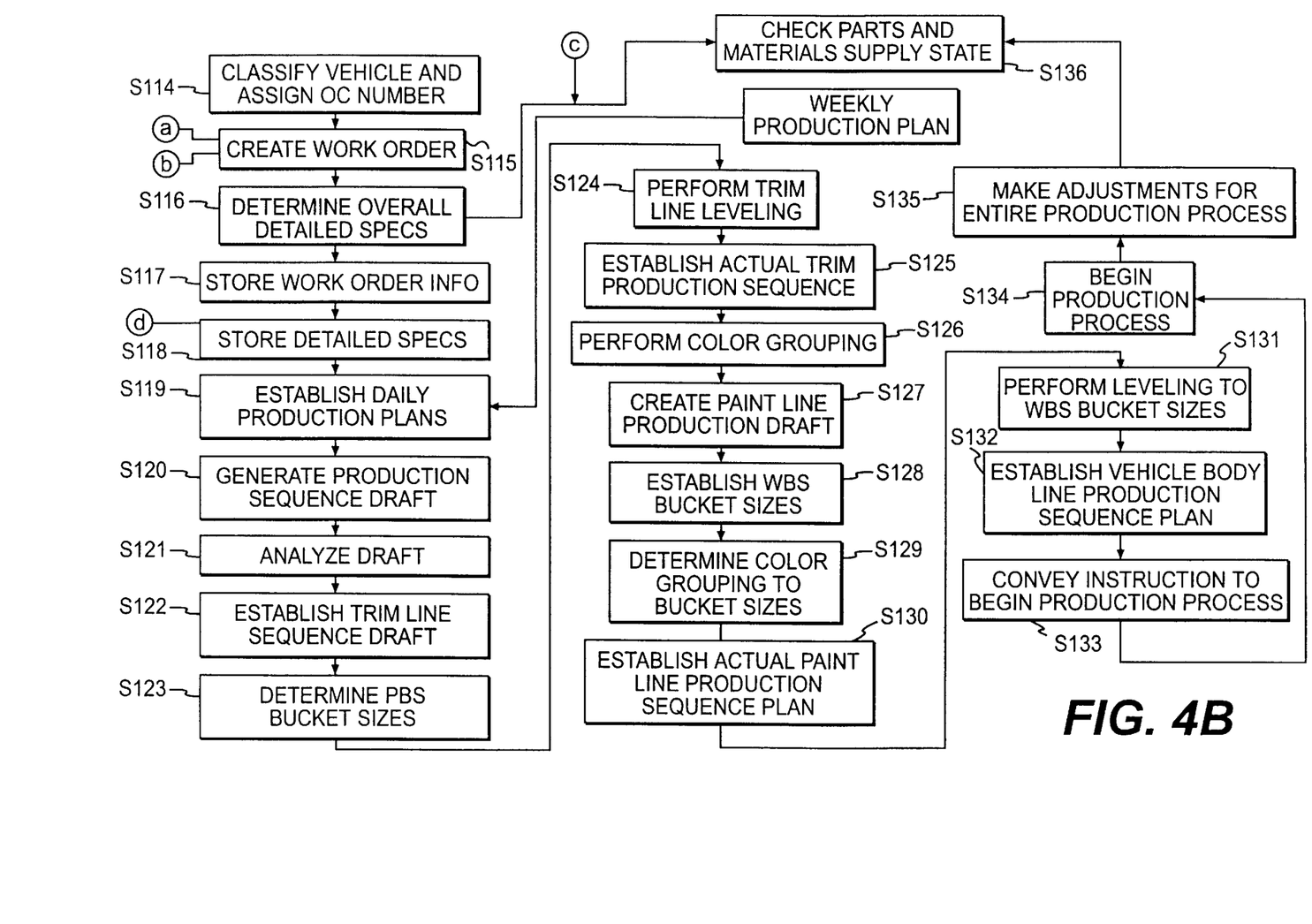

FIG. 4A and FIG. 4B show a flow diagram illustrating the sequence of production processes for the pull-type vehicle assembly line control system of the present invention. First, in step 101, the host computer system 100 integrates information related to vehicle orders received from various computer networks and constructs a chart of which parts are needed to assemble vehicles according to the vehicle orders over a predetermined period of time of, for example, one day or one week. Next, a code of changes in the parts, according to the supply and consumption of the same, is determined in step S102.

After the above step, a list of basic parts and materials is made in step S103, a program of specific controls for the production process is input in step S104, and after technical specifications notified in step S105, it is determined when changes in specifications are to take place in step S106.

Using the above chart for needed parts generated in step S101, a draft specification chart is established in step S107, a table is made for various other factors such as specifications required for particular countries, models, options, etc. in step S108, and a final specification chart is created and transmitted to each slave system in step S109. Further, in step S110, information pertaining to the timing of assembly according to the final specification chart is input to each slave system.

Next, using the final specification chart as a basis, a production specification chart is established, the same is codified, then provided as basic data of work orders for each production line in step S111.

Subsequently, in step S112, the host computer system 100 determines specific designs according to car type, options, etc., and paint colors and patterns for the vehicles. In step S113, timing for when a newly-developed paint color or pattern is to be implemented into the assembly process is determined.

In FIG. 4B, the host computer system 100 then classifies the vehicles according to vehicle type, options, etc. and assigns an option combination number to each vehicle in step S1 14. Next, the model specification table of step S108, the production specification chart of step S111, and specific vehicle designs and colors determined in steps S112 and S113 are combined and analyzed, and a work order is created in step S115, the work order acting as a guide during actual production processes. Using the work order as a basis, detailed specifications for the entire assembly line are determined in step S116.

After the above, information of the established work order is stored in step S117, then that of the detailed specifications for the assembly line is also stored in step S118. A daily production plan is then established using this information, and transmitted to the production management control system 200 in step S119.

The production management control system 200 establishes a production sequence using the daily production schedule. Namely, in step S120, a production sequence draft is generated considering only production sequences for the vehicle body and trim lines 232 and 213, then after analyzing the draft with consideration to leveling of the vehicle body and trim lines 232 and 213 and color grouping for the paint line 234 to adjust the actual production processes in step S121, a production sequence plan for the trim line 213 is sent to the trim line control slave system 210.

The trim line control slave system 210 analyzes the received trim line production sequence plan and establishes a production sequence draft in step S122, then determines PBS bucket sizes and intervals between the same suitable for the trim line 213 in step S123.

Next, in step S124, leveling is performed for the trim options to bucket sizes determined above, an actual trim production sequence plan is established in step S125, then the same is transmitted to the paint line control slave system 220. Here, the trim production sequence plan is established according to the PBS bucket sizes.

After the above step, the paint line control slave system 220 performs leveling according to vehicle body type and color grouping in step S126. Next, in step S127, a paint line production draft is formulated, and, using this as a basis, WBS bucket sizes are established with considerations of WBS production capacity in step S128. Here, as stated above, WBS bucket size is smaller than PBS bucket size, PBS bucket size preferably being a multiple of WBS bucket size to enable simpler readjusting. Subsequent to determining WBS bucket size, color grouping is determined within the pre-determined bucket sizes in step S129, and an actual paint line production sequence plan is established in step S130, after which the same is transmitted to the vehicle body line control slave system 230.

The vehicle body line control slave system 230 then performs leveling to the WBS bucket sizes according to vehicle body type in step S131, and establishes a vehicle body line production sequence plan in step S132. Next, in step S133, the vehicle body line production sequence plan is transmitted to the feed sequence control slave system 231, and an instruction is conveyed to begin the production process.

After step 133, production is performed in step S134. During production, slave systems for each production line is exchanged and transmitted to the production management control system 200 such that adjustments for the entire production process can be made by the same in step S135.

Finally, in step S136, the production management control system 200 transmits information related to the overall production process to the host computer system 100 such that the supply condition for parts and materials can be checked.

Figure 5:
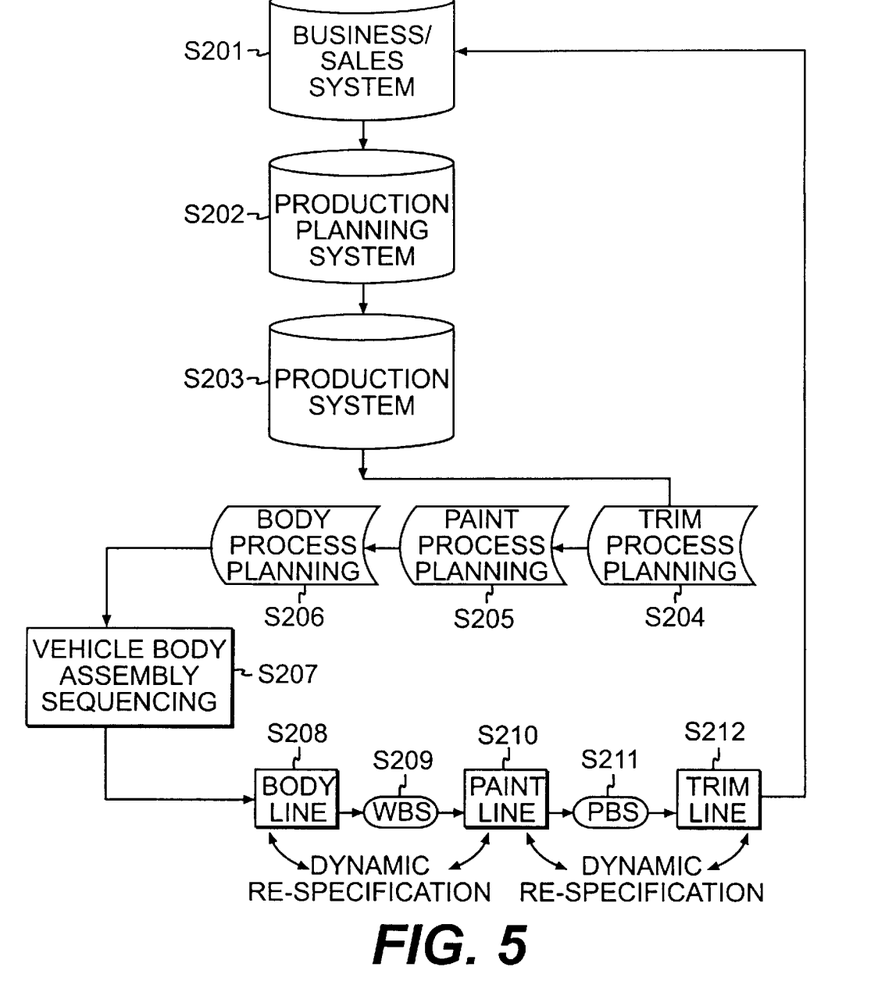
FIG. 5 is a flow chart of a vehicle assembly method according to a preferred embodiment of the present invention.
Figure 6:
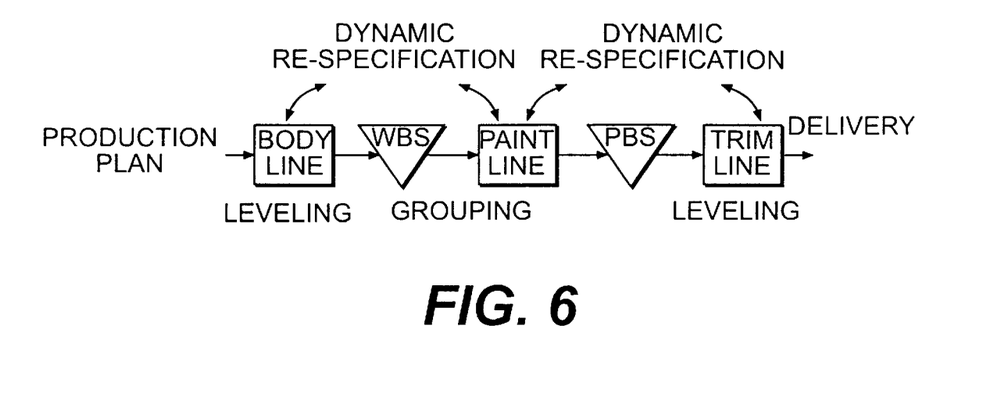
FIG. 6 is a schematic diagram of the inventive system using the method shown in FIG. 5.

Referring to FIGS. 5 and 6, shown respectively are a flow chart of the inventive vehicle assembly method and a schematic diagram of the inventive system using the method described in FIG. 5. Differences between the vehicle assembly method and system of the present invention and that of the prior art can be easily seen by viewing FIGS. 9 and 10.

The establishment of the production plans, and execution of the leveling and color grouping processes will be described hereinafter. When determining the sequence in which vehicles are fed to one of the production lines, either leveling is performed, in which vehicles are arranged by type alternatingly or in a repeated pattern of A, B, C, A, B, C, A . . . , or grouping is applied, where vehicles are grouped together in a predetermined pattern of like and unlike vehicle types of, for example, A, A, A, B, B, B . . . type vehicles.

If it is decided to assembly N number of vehicles, leveling is performed using the following formula to determine the feed sequence of each vehicle.

The following symbols are first determined:

N is the number of vehicles to be assembled, i is the vehicle number (i=1, 2, 3 ... N), L is the number of variables used for leveling (e.g., using variables of type a, type b, and type c would result in L equalling 3), Lj is the leveling specifications j=1, 2, 3 ... L A(i,j): vehicle i corresponds to leveling specifications Lj, and has a value of 1 or 0. For example, when i is car 3 and has option 3, A(3,3)=1, and with no options A(3,3)=0.

Q(j) is the number of vehicles satisfying leveling specifications j among N number of vehicles, i.e., $$Q(j) = \sum_{i=1}^{N} A(i, j)$$

K is the frequency of sequence calculation,

Xk,i equaling 1 if vehicle i is fed in the K sequence, and 0 if not fed in this sequence, Q(k,j): the number of vehicles of leveling specifications Lj, fed at the k sequence, i.e., $$Q(k, j) = \sum_{s=1}^{k} X(s, i) \cdot A(i, j)$$

the set of cars in which supply into the assembly line has not been determined is S

S←{1,2,3 ... N} k is started from 1 and vehicle i satisfying the following condition is attained.

$$\text{Minimize} \sum_{j=1}^{L} \left( \frac{N}{Q(j)} \{Q(k-1, j) + A(i, j)\} - k \right)^2$$

Using the above formula, a vehicle having vehicle number i is fed to the k sequence.

Further, when it is decided that N number vehicles is to be assembled, the following color-grouping formula is used to determine the feed sequence for the paint line 234.

L is the variety of grouping specifications,

Lj is the grouping specifications j=1, 2 ... G

A(i,j): vehicle i corresponds to grouping specifications LJ, and has a value of 1 or 0 (i=1,2 ... N, J=1,2 ... G)

Q(j) is the number of vehicles satisfying grouping specifications Lj among N number of vehicles, i.e., $$Q(j) = \sum_{i=1}^{N} A(i, j)$$

Q(k,j): the number of vehicles of leveling specifications Lj fed up to iteration k, $$Q(k, j) = \sum_{s=1}^{k} X(s, i) \cdot A(i, j)$$

The remaining symbols are used identically to that of the formula for leveling, and vehicle i satisfying the following condition is attained.

$$\text{Maximize} \sum_{j=1}^{L} \left( \frac{N}{Q(j)} \{Q(k-1, j) + A(i, j)\} - k \right)^2$$

Using the above formula, the assembly sequence is determined such that vehicle number i is fed to the assembly line in the k order.

The determination of the assembly sequence using the above leveling and grouping formulas run counter to one another. Namely, if the production sequence is determined on the basis of only leveling, production efficiency for the portion of the assembly line requiring grouping is decreased, and vice versa. Accordingly, a new formula is needed that balances the above two leveling and grouping formulas.

When it is decided that N number vehicles is to be assembled, a formula combining the leveling formula and the grouping formula is used, i.e., the new formula combines the two existing formulas performing leveling and grouping to as much as an extent as possible.

The following symbols are first defined:

L is the number of varieties combining leveling specifications and grouping specifications, the remaining conditions are the same as in the above leveling and grouping formulas, and $$\text{Minimize} \sum_{j=1}^{L} \delta j \cdot \left( \frac{N}{Q(j)} \{Q(k-1, j) + A(i, j)\} - k \right)^2$$

the following condition is satisfied to realize vehicle i.

Using the above formula, the assembly sequence is determined such that vehicle number i is fed to the assembly line in the k order. In the above formula, δj is the weighted value given to specification j. Namely, when leveling and grouping run counter to one another for vehicle i in a random positioning of the sequence, it is determined whether leveling or grouping is to be weighted such that the values differ. Here, if leveling is weighted δj>0, and if grouping is weighted δj<0.

For example, during the establishment of the production plan in FIG. 4, as the sequence must be established such that both leveling and grouping are realized in step S124, the above combined formula is used. Further, as leveling is performed for the trim options to pre-determined bucket sizes in step S124, the leveling formula is used for this step, and the grouping formula is used for step S129, thereby determining the assembly sequence.

Production of vehicles is started after the production plan is established through the above process. However, the production plan often can not be exactly followed when problems result in the assembly process such as an insufficient supply of parts, malfunctions in the assembly machinery, and defects in the vehicles being assembled. In the latter case, the vehicle bodies are temporarily removed from the assembly line to be corrected then replaced in the assembly line. Accordingly, removed vehicle bodies are no longer in the original sequence. Here, although the vehicle bodies can be replaced to a certain degree in the buffers, as this problem arises a multiple number of times in each production line, it is not possible to completely correct the disordered sequence of the vehicles in the buffers.

In the present invention, the dynamic re-specification method is used to analyze the disordered sequence of the vehicles, then relabel the vehicles by exchanging order numbers of the same such that the sequence of the vehicles can be fully recovered and re-set in buckets to a sequence that is ideal for the subsequent process.

Figure 7:
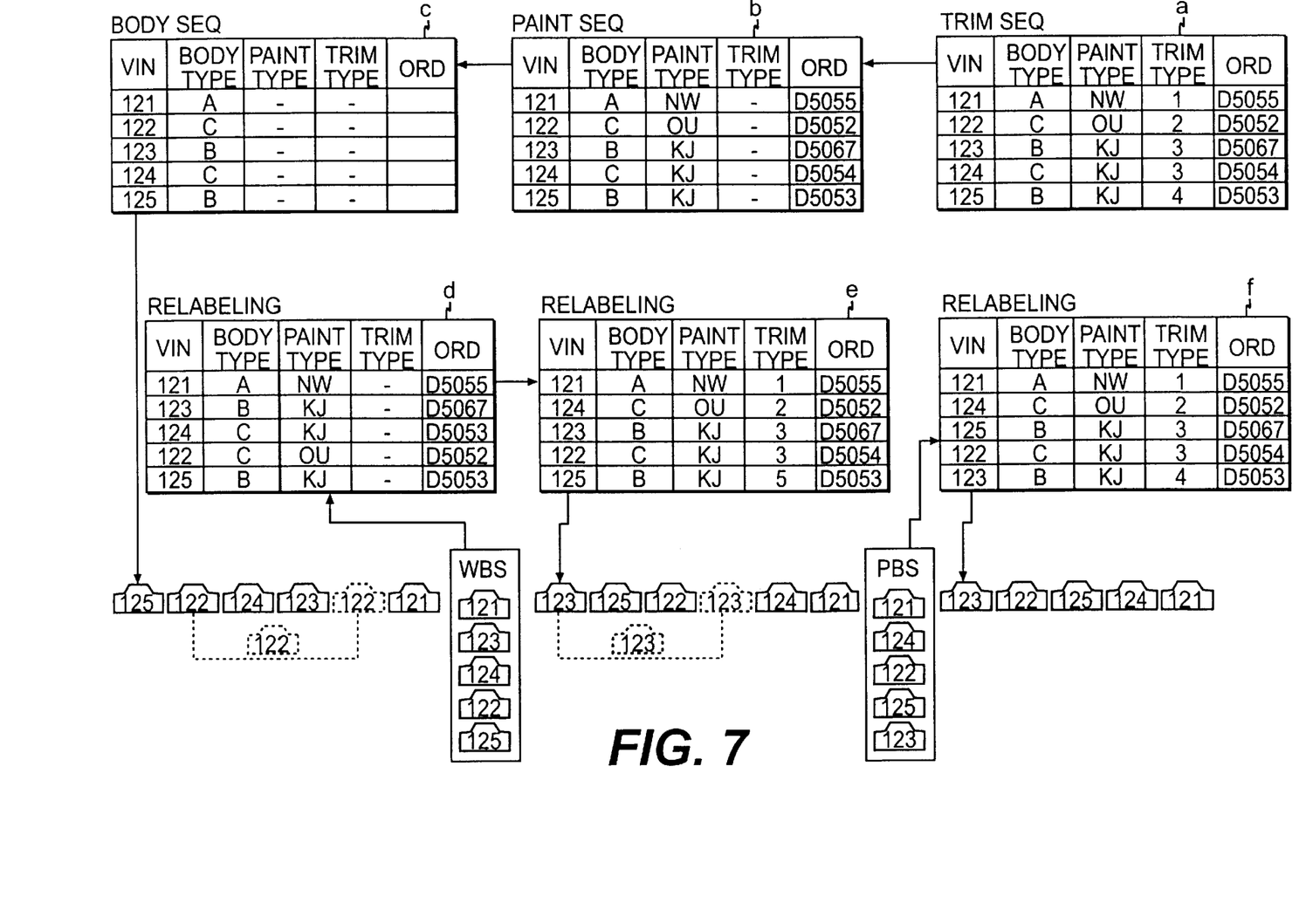
FIG. 7 are charts used for describing the inventive dynamic re-specification method.

Referring to FIG. 7, shown are charts used for describing the inventive dynamic re-specification method. For ease of explanation, it is assumed in the charts that the size of the bucket is five vehicles, and that the bucket sizes for the PBS 212 and the WBS 222 are the same. As described above, the PBS bucket is normally a multiple of the WBS bucket, and in large assembly lines is often many times the size of the WBS bucket.

Chart (a) of FIG. 7 is a chart established by the trim line control slave system 210 for the process sequence of the trim line 213 determined with considerations of leveling, grouping, weighted values, etc. of the production line. When there are weighted values for the vehicle body line 232, the paint line 234, or the trim line 213, the vehicle identification numbers VIN, corresponding to each order number ORD, are as shown in chart (a) of FIG. 7.

The paint line control slave system 220, after receiving the above process sequence plan, determines a process sequence for the paint line 234. Here, as shown in chart (b) of FIG. 7, since the plan established by the trim line control slave system 210 conforms to the grouping process of the paint line 234, there is no change in the relation between the order numbers ORD and vehicle identification numbers VIN.

Next, after receiving the above production sequence plan from the paint line control slave system 220, the vehicle body line control slave system 230 establishes a production sequence plan without considering the order numbers ORD. Here, as the vehicle body sequence is leveled, an initial sequence plan is maintained.

By the sequence established in the above, the feed sequence control slave system 231 performs control to supply vehicle bodies to the vehicle body line 232 in the order of VIN 121, 122, 123, 124, and 125. If no problems occur in the assembly line, the assembly processes are performed as planned. However, if defects are found in the vehicles during the production process, the planned sequence becomes disordered. For example, if assuming a defect is found in the vehicle having VIN 122, because of the time required to correct the defect, the vehicle with VIN 122 is returned to the assembly process behind the vehicle having VIN 124.

Such disorder in the sequence is corrected in the WBS 222. Here, as the dynamic re-specification method is used, the disordered sequence is more easily rectified. Namely, if the order of the vehicles in the WBS 222 is 121, 123, 124, 122, and 125, the order numbers ORD of the vehicles having VIN 122 and 124 are exchanged, unlike in the prior art where the vehicles are physically re-sequenced. Although the advantages of exchanging of order numbers ORD is not evident with a bucket size of 5 vehicles of the example, when bucket sizes reach 60 or more vehicles, and if many defects are discovered in the production process, the benefits of this method become clearer.

Namely, the initial order number ORD of the vehicle having VIN 124 is changed from D5054 to D5053. Accordingly, the vehicle with VIN 124 comes to receive paint with code OU instead of KJ as shown in chart (b) of FIG. 7. Namely, the vehicles are relabeled as shown in chart (d) of FIG. 7, and based on this chart, color grouping is performed again such that sequencing is realized for the paint line 234 as shown in chart (e) of FIG. 7. Here, only the sequence of the vehicles having VIN 124 and 123 are physically changed.

In the paint line 234, painting is performed in the order of VIN of 121, 124, 123, 122, and 125. During the paint process, if, for example, a defect is found in the vehicle having VIN 123 to require the same to be re-painted, VIN 123 is temporarily removed from the paint line 234 then replaced at a later position in the line. Accordingly, the vehicles enter the PBS 212 in this changed order.

Here, as the vehicles having VIN 123 and 125 are type "B" vehicles both requiring paint types of KJ, VIN 123 is re-labeled having order number D5053, which is type "4" trim type, and VIN 125 is re-labeled having order number D5967, which is type "3" trim type.

As can be seen by comparing chart (a) and chart (f), although the sequence of the vehicle identification numbers has changed, the order of assembly according to trim type is the same as originally planned. Although during actual processes in which bucket sizes are significantly larger, such a return to the original production plan is not possible, it is possible to get very near to the plan originally established.

Figure 8:
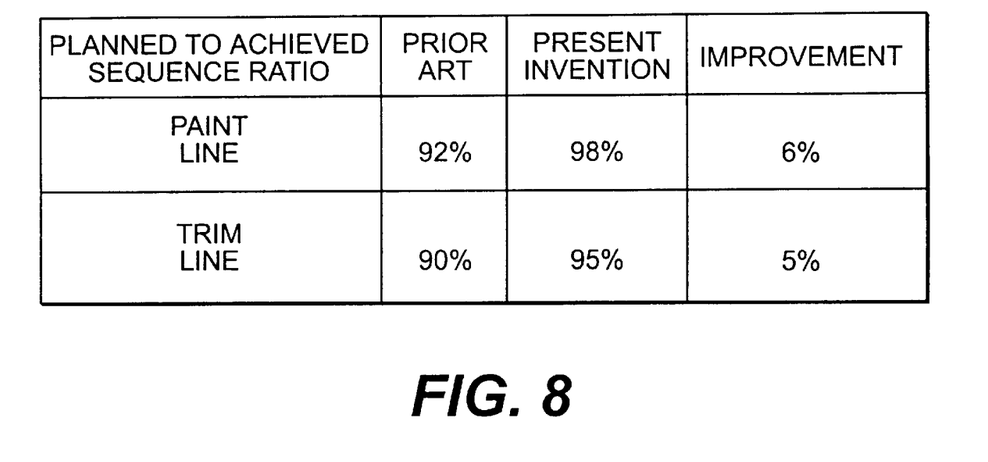
FIG. 8 is a chart illustrating productivity improvements achieved using the pull-type vehicle assembly line control system of the present invention.

By applying the pull-type vehicle assembly line control method of the present invention described above, productivity can be greatly improved over the prior art using equipment providing the same production capacity. That is, as shown in the chart of FIG. 8, productivity can be increased by 6% for the paint line, and 5% for the trim line.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A vehicle assembly line control method for controlling a vehicle assembly process having a vehicle body line for assembling vehicle bodies, a paint line for painting vehicle bodies after the same pass through the vehicle body line, a trim line in which various trim parts are mounted to the vehicle bodies after the same pass through the paint line, a WBS buffer positioned between the vehicle body line and the paint line and in which vehicles passing through the vehicle body line are temporarily stored, and a PBS buffer positioned between the paint line and the trim line and in which vehicles passing through the paint line are temporarily stored, wherein said method comprises the steps of:

(a) assigning vehicle identification numbers, signifying vehicle type, paint color, options, etc., to order numbers;

(b) establishing a trim line production sequence plan using leveling based on options for the trim line;

(c) dividing the vehicles to be fed to the trim line in predetermined PBS bucket sizes;

(d) establishing a paint line production sequence plan for the vehicles divided into PBS buckets using grouping to determine a sequence to which vehicles are fed to the paint line;

(e) dividing the vehicles to be fed to the paint line in predetermined WBS bucket sizes;

(f) establishing a vehicle body line production sequence plan for the vehicles divided into WBS buckets using leveling to determine a sequence to which vehicles are fed to the vehicle body line;

(g) assembling vehicle bodies according to the vehicle body line production sequence plan determined in step f;

(h) storing the vehicle bodies after the vehicle body assembly process in the WBS buffer;

(i) re-sequencing the vehicles in the WBS buffer that have become disordered from defects, then feeding the vehicles to the paint line;

(j) painting the vehicles fed to the paint line to predetermined colors and designs, and storing the same in the PBS buffer;

(k) re-sequencing the vehicles in the PBS buffer that have become disordered from defects, then feeding the vehicles to the trim line; and (l) mounting trim parts to the vehicles in the trim line to complete the vehicle assembly process, wherein the re-sequencing the vehicles in the WBS buffer in step (i) is performed using a dynamic re-specification method in which order number and vehicle identification numbers are exchanged to re-sequence the vehicles, and wherein the re-sequencing the vehicles in the PBS buffer in step (k) is performed using a dynamic re-specification method in which order number and vehicle identification numbers are exchanged to re-sequence the vehicles.

2. The vehicle assembly line control method of claim 1, wherein leveling for the trim line production sequence plan is performed using the following formula:

N is the number of vehicles to be assembled;
i is the vehicle number (i=1, 2, 3 . . . N);
L is the number of variables used for leveling;
Lj is the leveling specifications j=1, 2, 3 . . . L;
A(i,j): vehicle i corresponds to leveling specifications Lj, and has a value of 1 or 0;
Q(j) is the number of vehicles satisfying leveling specifications j among N number of vehicles, namely, $$Q(j) = \sum_{i=1}^{N} A(i, j)$$

K is the frequency of sequence calculation;
$X_{k,i}$ equaling 1 if vehicle i is fed in the K sequence, and 0 if not fed in this sequence;
Q(k,j): the number of vehicles of leveling specifications Lj, fed at the k sequence, namely, $$Q(k, j) = \sum_{s=1}^{k} X(s, i) \cdot A(i, j)$$

the set of cars in which supply into the assembly line has not been determined is S;

$S \leftarrow \{1,2,3 \ldots N\};$ k is started from 1; and vehicle i satisfying the following condition is attained, $$\text{Minimize} \sum_{j=1}^{L} \left( \frac{N}{Q(j)} \{Q(k-1, j) + A(i, j)\} - k \right)^2$$

a vehicle having vehicle number i is fed to the k sequence.

3. The vehicle assembly line control method of claim 1, wherein grouping for the paint line production sequence plan is performed using the following formula:

N is the number of vehicles to be assembled;
i is the vehicle number (i=1, 2, 3 . . . N);
L is the variety of grouping specifications;
Lj is the grouping specifications j=1, 2, 3 . . . N;
A(i,j): vehicle i corresponds to grouping specifications LJ, and has a value of 1 or 0 (i=1,2 . . . N, J=1,2 . . . G);
Q(j) is the number of vehicles satisfying grouping specifications Lj among N number of vehicles, namely, $$Q(j) = \sum_{i=1}^{N} A(i, j)$$

Q(k,j): the number of vehicles of leveling specifications Lj fed up to iteration k, $$Q(k, j) = \sum_{s=1}^{k} X(s, i) \cdot A(i, j)$$

$S \leftarrow \{1, 2, 3 \ldots N\};$ k is started from 1, $$\text{Maximize} \sum_{j=1}^{L} \left( \frac{N}{Q(j)} \{Q(k-1, j) + A(i, j)\} - k \right)^2$$

the assembly sequence being determined such that vehicle number i is fed to the assembly line in the k order.

4. The vehicle assembly line control method of claim 1, wherein a combined production sequence plan is established in which leveling of the trim line production sequence plan and grouping of the paint line production sequence plan are combined, and
wherein the combined production sequence plan is determined using the following formula:
N is the number of vehicles to be assembled;
i is the vehicle number (i=1, 2, 3 . . . N);
L is the number of varieties combining leveling specifications and grouping specifications,
Lj is the leveling and grouping specifications j=1, 2, 3 . . . N;
A(i,j): vehicle i corresponds to grouping specifications LJ, and has a value of 1 or 0 (i=1, 2 . . . N, J=1, 2 . . . G);
Q(j) is the number of vehicles N satisfying j, namely, $$Q(j) = \sum_{i=1}^{N} A(i, j)$$

Q(k,j): the number of vehicles of specifications j fed up to iteration k, $$Q(k, j) = \sum_{s=1}^{k} X(s, i) \cdot A(i, j)$$

using the above formula, $\delta_j$ is the weighted value given to specification j, where if leveling is weighted $\delta_j > 0$, and if grouping is weighted $\delta_j < 0$, $S \leftarrow \{1, 2, 3 \ldots N\};$ k is started from 1, $$\text{Minimize} \sum_{j=1}^{L} \delta_j \cdot \left( \frac{N}{Q(j)} \{Q(k-1, j) + A(i, j)\} - k \right)^2$$

the assembly sequence being determined such that vehicle number i is fed to the assembly line in the k order.

5. The vehicle assembly line control method of claim 1, wherein leveling for the vehicle body line production sequence plan is performed using the following formula:

N is the number of vehicles to be assembled;
i is the vehicle number (i=1, 2, 3 . . . N);
L is the number of variables used for leveling;
Lj is the leveling specifications j=1, 2, 3 . . . L;
A(i,j): vehicle i corresponds to leveling specifications Lj, and has a value of 1 or 0;
Q(j) is the number of vehicles satisfying leveling specifications j among N number of vehicles, namely, $$Q(j) = \sum_{i=1}^{N} A(i, j)$$

K is the frequency of sequence calculation;
$X_{k,i}$ equaling 1 if vehicle i is fed in the K sequence, and 0 if not fed in this sequence;
Q(k,j): the number of vehicles of leveling specifications Lj, fed at the k sequence, namely, $$Q(k, j) = \sum_{s=1}^{k} X(s, i) \cdot A(i, j)$$

the set of cars in which supply into the assembly line has not been determined is S;

$S \leftarrow \{1, 2, 3 \ldots N\};$ k is started from 1;
and vehicle i satisfying the following condition is attained, $$\text{Minimize} \sum_{j=1}^{L} \left( \frac{N}{Q(j)} \{Q(k-1, j) + A(i, j)\} - k \right)^2$$

a vehicle having vehicle number i is fed to the k sequence.

6. A vehicle assembly line control system for controlling a vehicle assembly process having a vehicle body line for assembling vehicle bodies, a paint line for painting vehicle bodies after the same pass through the vehicle body line, a trim line in which various trim parts are mounted to the vehicle bodies after the same pass through the paint line, a WBS buffer positioned between the vehicle body line and the paint line and in which vehicles passing through the vehicle body line are temporarily stored, and a PBS buffer positioned between the paint line and the trim line and in which vehicles passing through the paint line are temporarily stored, wherein said system comprises:

a host computer system electronically connected to and controlling business, production, and sales computer networks;

a production management control system controlling all production processes;

a trim line control slave system receiving commands from the production management control system and which controls trim line assembly processes;

a paint line control slave system receiving commands from the production management control system and which controls paint line assembly processes;

a vehicle body line control slave system receiving commands from the production management control system and which controls paint line assembly processes;

a paint dynamic re-specification control system for re-sequencing the vehicles in the WBS buffer, which have become disordered as a results of discovered defects, using a dynamic re-specification method; and a trim dynamic re-specification control system for re-sequencing the vehicles in the PBS buffer, which have become disordered as a results of discovered defects, using the dynamic re-specification method.

* * * * *